Sept. 22, 1936.　　　　　J. ZILLIOX　　　　　2,055,373
TOOL FOR TRIMMING PISTON RINGS AND THE LIKE
Filed Oct. 9, 1934
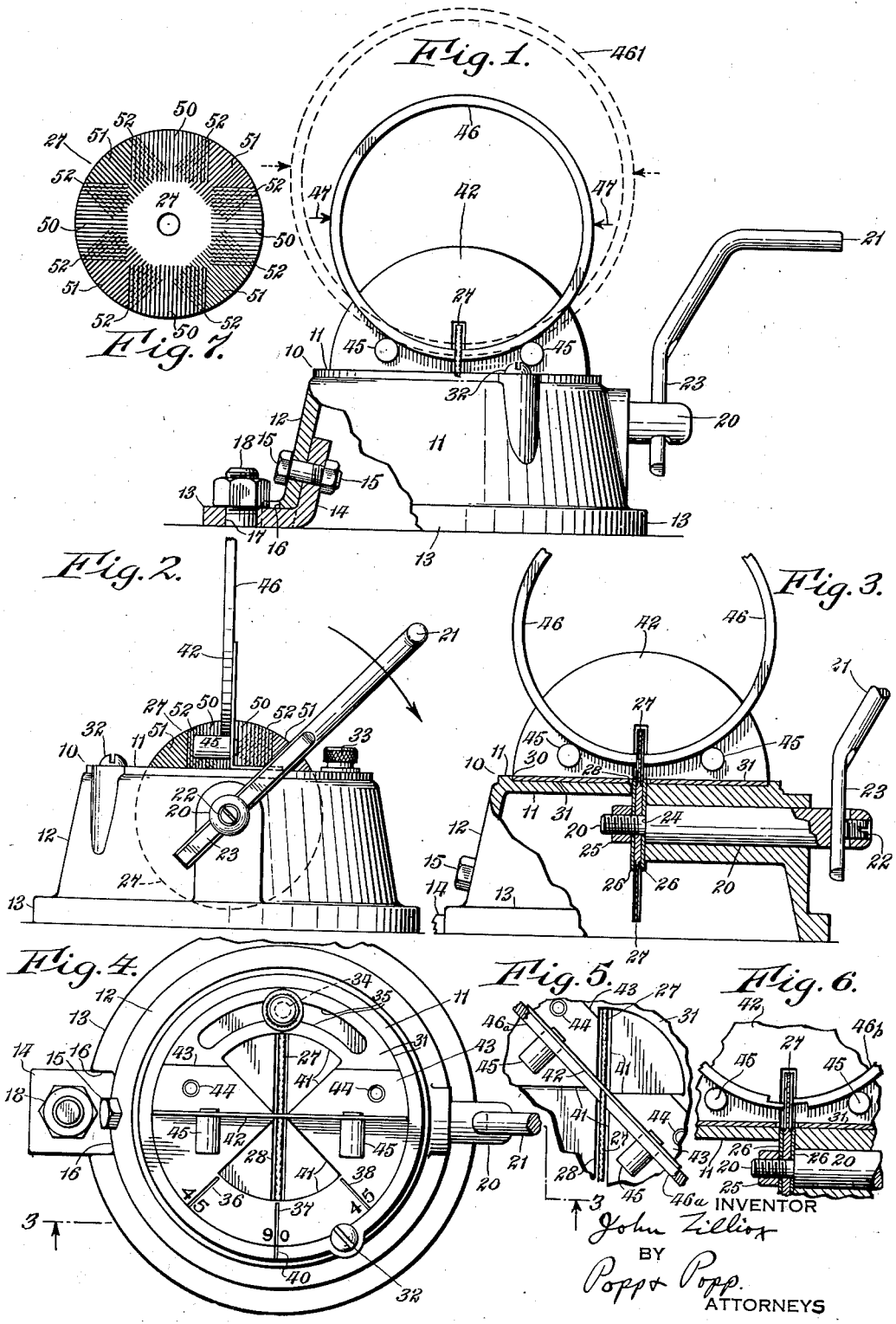
INVENTOR
John Zilliox
BY
Popp & Popp
ATTORNEYS Patented Sept. 22, 1936

2,055,373

UNITED STATES PATENT OFFICE 2,055,373

TOOL FOR TRIMMING PISTON RINGS AND THE LIKE

John Zilliox, Orchard Park, N. Y.

Application October 9, 1934, Serial No. 747,602

6 Claims. (Cl. 29—76)

The invention particularly relates to a tool for trimming off the abutting ends of a piston ring so that said ring will have a circumferential gap which is sufficiently large to properly fit its particular companion cylinder and prevent said ring from being restrained against radial movement under any operating conditions, said circumferential gap being at the same time sufficiently small to prevent an undue leakage of gas past the piston ring.

The object of the invention is to provide a simple, inexpensive and convenient tool of this character which will be capable of accurately trimming the ends of either a square ended, a bevel ended, or a step ended piston ring of any diameter and of any cross-sectional shape.

In the accompanying drawing:—

Figure 1 is a side elevation of the tool with one end thereof partially broken away with a square ended piston ring in place thereon.

Figure 2 is an end elevation of the tool with the same square ended type of piston ring in place thereon.

Figure 3 is a vertical, longitudinal section of the tool taken on line 3—3 Fig. 4, and also showing a square ended piston ring in place thereon.

Figure 4 is a top plan view of the tool without any piston ring in place thereon.

Figure 5 is a fragmentary top plan of the tool showing how the tool is adjusted to trim the ends of a bevel ended piston ring.

Figure 6 is a fragmentary, vertical, longitudinal section of the tool showing how it is adjusted to trim the ends of a step ended piston ring.

Figure 7 is a side elevation of the circular file which constitutes the trimming member of the tool.

In the following description similar characters of reference indicate like parts in the several figures of the drawing.

The base 10 of the invention is preferably of inverted cup shape, having a flat, horizontal upper face or floor 11, disposed upon a downwardly and outwardly flared, supporting portion 12, terminating at its lower peripheral edge in an annular, outwardly extending flange 13. This base is preferably clamped to some heavy stationary object, such as to a work bench or directly to the particular cylinder block which is being fitted with piston rings. This clamping may be effected by an angle plate 14 which is secured to the base 10 by a bolt 15 and is prevented from twisting laterally out of position relatively to said base by being received within a slot 16 formed radially in the lower part of the base 10. The outer end of said angle plate is drilled at 17 to receive a bolt 18 extending up from the work bench, cylinder block or other stationary object to which the tool is clamped.

Journaled horizontally and longitudinally in said base is a trimming member shaft 20 which is adapted to be manually rotated by means of a detachable handle 21 held in place by a headless set screw 22 whose inner end bears against a flattened portion 23 of said handle 21. The inner end of this shaft 20 is reduced to form an annular shoulder 24 and is threaded inwardly of said shoulder 24 to receive a nut 25. Clamped between said nut 25 and shoulder 24 are a pair of washers 26 between which is sandwiched a disk-shaped, two faced, file or other trimming member 27. Said trimming member projects up through the floor 11 of the base 10 through a suitable rectangular clearance aperture 28.

The most convenient manner of rotating the shaft 20 is to swing the handle 21 in a clockwise direction, as seen in Fig. 2. The screw thread at the inner end of said shaft 20 is the ordinary right-handed thread. By reason of these two facts, it follows that, when the disk-shaped trimming member 27 is in operation and is therefore subjected to a resistance, it will tend to frictionally move the washers 26 and the nut 25 in a counter-clockwise direction as seen in Fig. 2 relatively to the shaft 20. This causes said nut 25 to be tightened on said shaft 20, and obviates the necessity of tightening up said nut extremely tight and yet permits the disk-shaped trimming member 27 to carry a heavy torque load without slipping. This construction also eliminates the need of a keyway or other relatively expensive construction to prevent said trimming member turning relatively to said shaft.

The upper face of the floor 11 of the base 10 is annularly and concentrically countersunk at 30 to receive a disk-shaped, rotatable table 31. The latter is prevented from lifting up out of position by a holding down screw 32 and a clamping screw 33. Said holding down screw 32 is secured to the upper face of the base 10 adjacent the front edge of the rotatable table 31 and slidably bears with the lower face of its head against the upper face of said table. The threaded shank of the clamp screw 33 is received within a suitable tapped hole 24 formed in the base 10, said shank passing through an arcuate slot 35 suitably formed in the rotatable table 31. Thus, by loosening the clamping screw 33, said rotatable table 31 may be swung to any desired position about its concentric axis and then held firmly in place by tightening said clamping nut 33.

The indexing of said rotatable table 31 is facilitated by three radial indexing grooves 36, 37, 38, grooves 36 and 38 being each marked "45" which indicates forty-five degrees, while groove 37 is marked "90" which indicates ninety degrees. Any one of these three indexing grooves 36, 37 or 38 (for instance groove 37 as shown in Figs. 1-4) is adapted to index with a stationary index groove 40 formed radially in the top face of the base 10.

To permit said rotatable table 31 to be swung to either of its extreme positions without interference by the trimming member 27, said rotatable table 31 is suitably cut away segmentally at 41.

Arranged diametrically on the upper face of the rotatable table 31 is a vertical, half-disk-shaped face plate 42 whose lower end is bent sharply rearward to form the flanges 43 which are secured to the rotatable table 31 by spot welding 44 or otherwise.

Secured to and projecting perpendicularly out from said face plate 42 at equal distances from the axis of rotation of the table 31 is a pair of horizontal locating pins 45 which are parallel with each other and lie in the same horizontal plane. These locating pins 45 are adapted to properly position any type or diameter of piston ring in correct alignment relatively to the rotary trimming member 27. For instance, in Figs. 1-3 is shown a piston ring 46 which is of the plain butt or square ended type. This piston ring 46 is supported upon the locating pins 45 in the manner shown in Fig. 1, the square ends of said piston ring being forced into contact with the trimming member 27 by a suitable manual or other pressure indicated by the arrows 47. While the piston ring is in this position, the handle 21 is rotated, thereby causing the rotatable trimming member 27 to likewise be rotated. Said trimming wheel is provided with either an abrasive or a cutting surface so as to enable it to grind, cut or otherwise trim off the desired amount of metal from the ends of the piston ring. The contact between said piston ring and the locating pins 45 is a point contact. By reason of this fact, a piston ring is located in correct alignment relatively to the rotary trimming member 27 irrespective of the diameter of the piston ring.

In Fig. 1, for instance, is shown in full lines a relatively small, square ended, piston ring 46, while in dotted lines is shown a larger, square ended piston ring 46l. In both cases it will be noted that (if the thickness of the rotary trimming member 27 be neglected) the ends of both sizes of piston ring are trimmed off on a plane which intersects the axis of the piston ring in question. This means that when either of the piston rings is compressed into position in its companion cylinder, the gap between the ends of the piston ring (usually .010"-.014") is of even thickness.

It should also be noted that even if the one or other size of piston ring is not held back firmly against the face plate 42, the trimming off of the adjacent ends of the piston ring will be in a plane intersecting the axis of the ring. If the piston ring is thus tipped relatively to the face plate 42 it is preferable to tip the upper end out so as to compel the abutting ends at the lower end of the piston ring to bear firmly against said face plate and thereby prevent any tendency of the piston ring to chatter. This is because the frictional force of the rotary trimming member 27 urges the adjacent ends of the piston ring toward said face plate when the handle 21 is rotated in a clockwise direction, as seen in Fig. 2.

The present invention is also adapted to trim the ends of a bevel ended piston ring 46a such as that shown in Fig. 5, in which the ends of said piston ring are bevelled at 45°. To enable the present invention to trim the ends of such a ring the clamp screw 33 is loosened and the table 31 rotated in the one or other direction (depending upon which way the bevel of the ring slopes) until either the rotatable table index groove 36 or 38 registers with the stationary index groove 40 of the base 10. The clamping screw 33 is now tightened and said piston ring 46a trimmed in substantially the same manner as that shown in Figs. 1-4; the only difference in this case being that the face plate 42 is disposed at an angle relatively to the rotary trimming member 27.

In Fig. 6 is shown how the invention is used to trim the ends of a step ended piston ring 46b. In this case the rotary table 31 is set as in Figs. 1-4, i. e., with the rotary table index groove 37 in register with the stationary index groove 40 of the base 10.

The present invention can successfully employ any type of rotary trimming member 27 whether of the abrasive or of the cutting type. It has been found, however, that inasmuch as piston rings are constructed of cast gray iron, the best type of rotary trimming wheel is one constructed similarly to an ordinary file, the preferred form of which is shown detached in Fig. 7. This consists of a circular steel disk which is suitably perforated axially so as to slide over the shaft 20 and is deep, radially, gang milled in four directions at right angles to each other to form the deep milled file teeth 50 and is shallow, radially, gang milled in four directions at right angles to each other to form the shallow milled file teeth 51.

Said shallow milled teeth 51 are formed at 45° to the deep milled teeth 50. Where the deep milled teeth 50 overlap the shallow milled teeth 51 there is caused the formation of triangular areas having bastard teeth 52. Such bastard teeth can be formed even if the depth of the milled teeth 50 is equal to the depth of the milled teeth 51. It is preferred, however, that the one set (50) of milled teeth be deeper than the other set (51) of milled teeth, so that the bastard teeth 52 will be prismatic in form and therefore strong rather than pyramidal in form and therefore weak. Such a construction results in a rotary trimming member which may be considered a combination of milled file and bastard file. Such a rotary trimming member having such milled and bastard teeth on both of its faces has proven very satisfactory in actual service.

I claim as my invention:—

1. A tool for trimming piston rings and the like comprising: a base having an upper horizontal face which is circularly countersunk; a circular rotatable table arranged within said circularly countersunk surface and having its circular edge in engagement with the circular shoulder of the countersunk portion of said base; a trimming member journaled horizontally in said base; a face plate connected with said table; and means for holding the piston ring upon said face plate to enable said ring to be cut by the trimming member.

2. A tool for trimming piston rings and the like comprising: a base having an upper horizontal face which is circularly countersunk; a circular rotatable table arranged within said circularly countersunk surface and having its circular edge in engagement with the circular shoulder of the countersunk portion of said base; a trimming member journaled horizontally in said base; a vertical face plate connected with said table; and means for holding the piston ring upon said face plate to enable said ring to be cut by the trimming member.

3. A tool for trimming piston rings and the like comprising: a base having an upper horizontal face which is circularly countersunk; a circular rotatable table arranged within said circularly countersunk surface and having its circular edge in engagement with the circular shoulder of the countersunk portion of said base; a trimming member journaled horizontally in said base on on axis lying in a vertical plane which intersects the axis of said table; a face plate connected with said table; and means for holding the piston ring upon said face plate to enable said ring to be cut by the trimming member.

4. A tool for trimming piston rings and the like comprising: a base having an upper horizontal face which is circularly countersunk; a circular rotatable table arranged within said circularly countersunk surface and having its circular edge in engagement with the circular shoulder of the countersunk portion of said base; a trimming member journaled horizontally in said base and projecting up through said table; a face plate connected with said table; and means for holding the piston ring upon said face plate to enable said ring to be cut by the trimming member.

5. A tool for trimming piston rings and the like comprising: a base having an upper horizontal face which is circularly countersunk; a circular rotatable table arranged within said circularly countersunk surface and having its circular edge in engagement with the circular shoulder of the countersunk portion of said base; a face plate connected with said table; a trimming member journaled horizontally in said base and projecting up through said base and up into said face plate; and means for holding the piston ring upon said face plate to enable said ring to be cut by the trimming member.

6. A tool for trimming piston rings and the like comprising: a base having an upper horizontal face which is circularly countersunk; a circular rotatable table arranged within said circularly countersunk surface and having its circular edge in engagement with the circular shoulder of the countersunk portion of said base; a trimming member journaled horizontally in said base and projecting up through said table through a double segmental clearance opening formed in said table; a face plate connected with said table; and means for holding the piston ring upon said face plate to enable said ring to be cut by the trimming member.

JOHN ZILLIOX.